United States Patent
Ehlen et al.

(10) Patent No.: US 9,026,915 B1
(45) Date of Patent: May 5, 2015

(54) SYSTEM AND METHOD FOR CREATING A PRESENTATION USING NATURAL LANGUAGE

(75) Inventors: Patrick Ehlen, San Francisco, CA (US); David Crawford Gibbon, Lincroft, NJ (US); Mazin Gilbert, Warren, NJ (US); Michael Johnston, New York, NY (US); Zhu Liu, Marlboro, NJ (US); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1664 days.

(21) Appl. No.: 11/263,051

(22) Filed: Oct. 31, 2005

(51) Int. Cl.
  *G06F 17/00* (2006.01)
  *G06F 17/30* (2006.01)

(52) U.S. Cl.
  CPC .............................. *G06F 17/30781* (2013.01)

(58) Field of Classification Search
  CPC ............ G06F 17/30418; G06F 3/0481; G06F 17/241; G06F 3/04842; G06F 3/04812; G06F 3/038; G06F 3/0482; G06F 3/167; H04N 5/74; G06Q 10/10; G11B 27/105
  USPC .......... 707/100, 500, 513; 709/204, 217, 218; 715/200, 201, 224, 234, 236, 255, 256, 715/500, 760, 202, 862, 730, 732, 273, 715/705–721
  See application file for complete search history.

(56) References Cited

U.S. PATENT DOCUMENTS

| | | | |
|---|---|---|---|
| 5,442,744 A | 8/1995 | Piech et al. | |
| 5,740,425 A * | 4/1998 | Povilus | 707/100 |
| 6,144,991 A | 11/2000 | England | |
| 6,351,765 B1 | 2/2002 | Pietropaolo et al. | |
| 6,397,181 B1 * | 5/2002 | Li et al. | 704/256.4 |
| 6,490,550 B1 | 12/2002 | Hiri | |
| 6,526,351 B2 | 2/2003 | Whitham | |
| 6,665,835 B1 * | 12/2003 | Gutfreund et al. | 715/202 |
| 6,789,105 B2 | 9/2004 | Ludwig et al. | |
| 6,868,383 B1 | 3/2005 | Bangalore et al. | |
| 6,968,506 B2 | 11/2005 | Yacovone et al. | |
| 7,124,366 B2 | 10/2006 | Foreman et al. | |
| 7,131,059 B2 | 10/2006 | Obrador | |
| 7,725,307 B2 | 5/2010 | Bennett | |
| 7,725,320 B2 | 5/2010 | Bennett | |
| 7,873,652 B1 * | 1/2011 | Hill | 707/769 |
| 2002/0036694 A1 * | 3/2002 | Merril | 348/220 |
| 2002/0150869 A1 | 10/2002 | Shpiro | |
| 2003/0023435 A1 | 1/2003 | Josephson | |
| 2003/0023440 A1 | 1/2003 | Chu | |
| 2003/0208473 A1 | 11/2003 | Lennon | |
| 2004/0083092 A1 * | 4/2004 | Valles | 704/9 |
| 2004/0103150 A1 | 5/2004 | Ogdon et al. | |
| 2004/0103372 A1 * | 5/2004 | Graham | 715/513 |

(Continued)

*Primary Examiner* — Quoc A Tran

(57) ABSTRACT

The invention provides for a system, method, and computer readable medium storing instructions related to controlling a presentation in a multimodal system. The method embodiment of the invention is a method for the retrieval of information on the basis of its content for incorporation into an electronic presentation. The method comprises receiving from a user a content-based request for at least one segment from a first plurality of segments within a media presentation preprocessed to enable natural language content searchability; in response to the request, presenting a subset of the first plurality of segments to the user; receiving a selection indication from the user associated with at least one segment of the subset of the first plurality of segments and adding the selected at least one segment to a deck for use in a presentation.

11 Claims, 9 Drawing Sheets

(56) References Cited

U.S. PATENT DOCUMENTS

| | | |
|---|---|---|
| 2004/0220926 A1 | 11/2004 | Lamkin et al. |
| 2005/0038660 A1 | 2/2005 | Black et al. |
| 2005/0050042 A1* | 3/2005 | Elder ............................ 707/4 |
| 2005/0114825 A1 | 5/2005 | Leung et al. |
| 2005/0144258 A1* | 6/2005 | Burckart et al. .......... 709/218 |
| 2005/0216443 A1 | 9/2005 | Morton et al. |
| 2005/0273693 A1* | 12/2005 | Peterson .................. 715/500.1 |
| 2006/0008256 A1 | 1/2006 | Khedouri et al. |
| 2006/0047637 A1 | 3/2006 | Meyerzon et al. |
| 2006/0048058 A1 | 3/2006 | O'Neal et al. |
| 2006/0123045 A1* | 6/2006 | Chang et al. ................ 707/102 |
| 2006/0294468 A1* | 12/2006 | Sareen et al. ............... 715/730 |
| 2006/0294469 A1* | 12/2006 | Sareen et al. ............... 715/730 |
| 2008/0082568 A1* | 4/2008 | Miller et al. ................ 707/102 |
| 2008/0177866 A1* | 7/2008 | Bodin et al. ................. 709/219 |
| 2008/0201375 A1 | 8/2008 | Khedouri et al. |
| 2008/0306988 A1* | 12/2008 | Aggarwal et al. ............ 707/102 |
| 2009/0254828 A1* | 10/2009 | Denoue et al. .............. 715/723 |

* cited by examiner

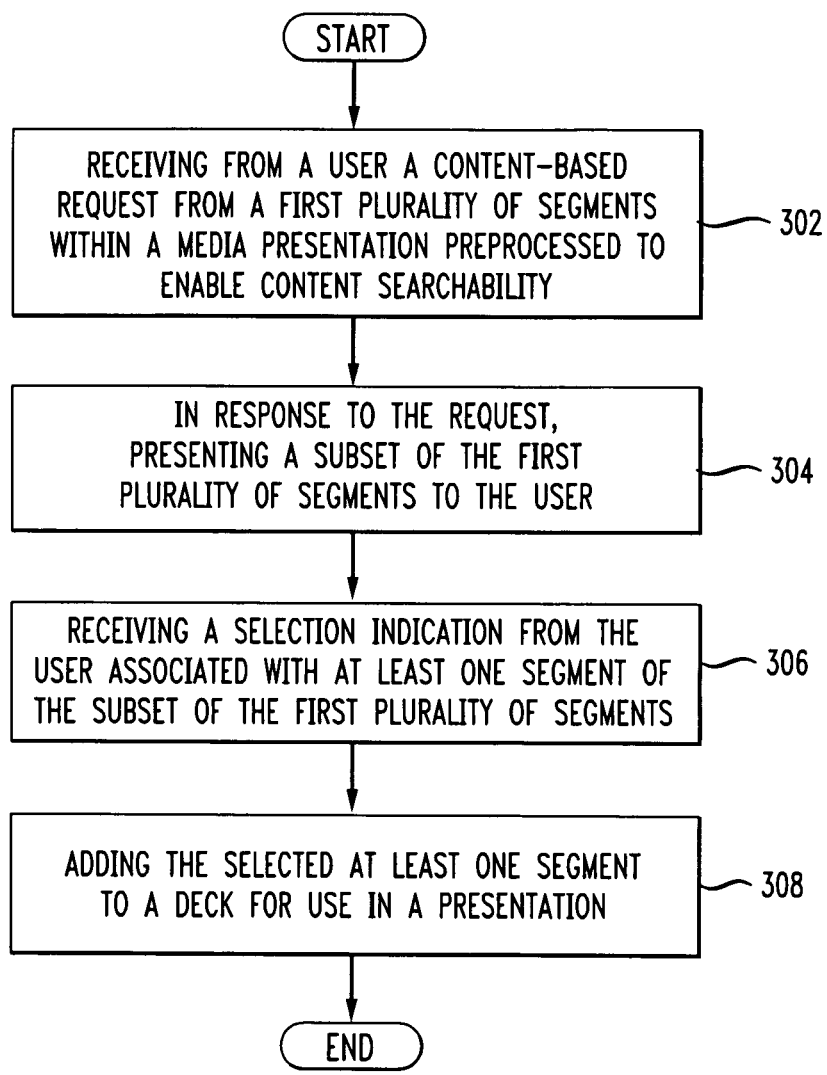

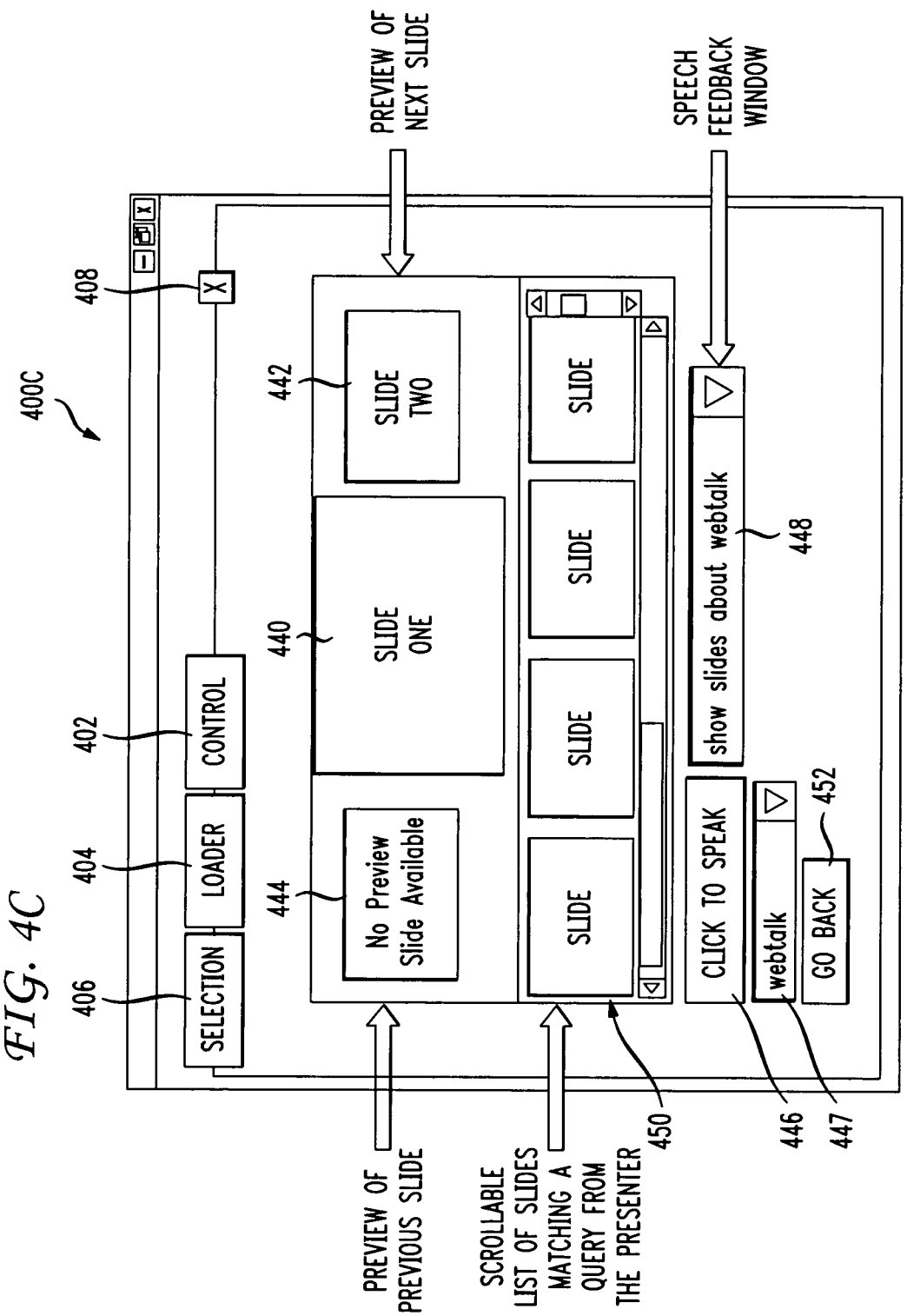

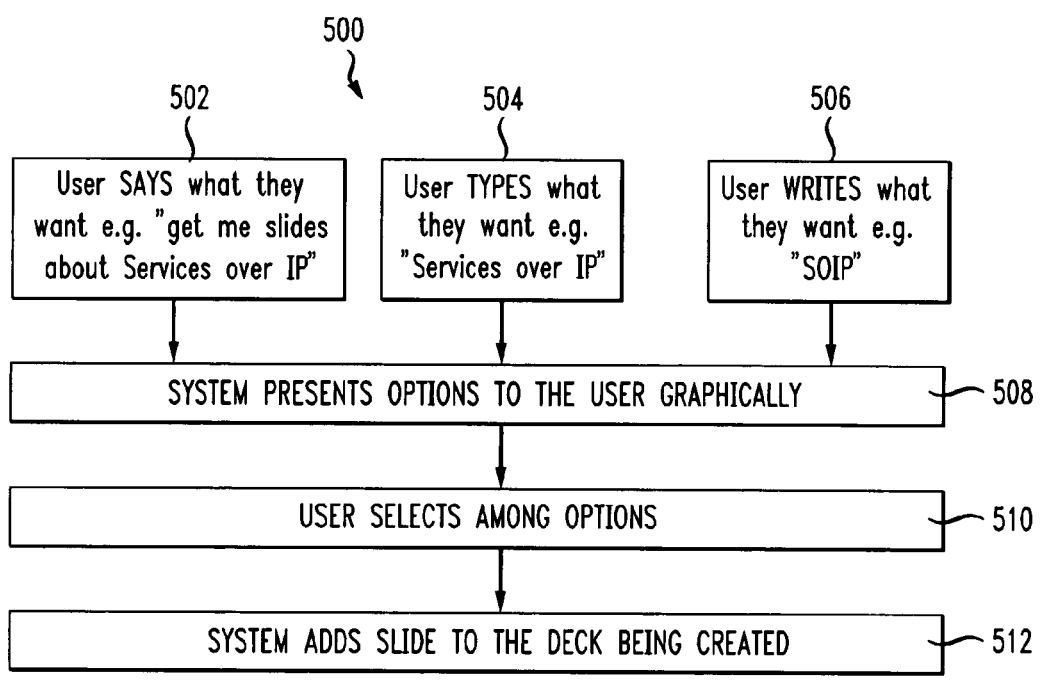

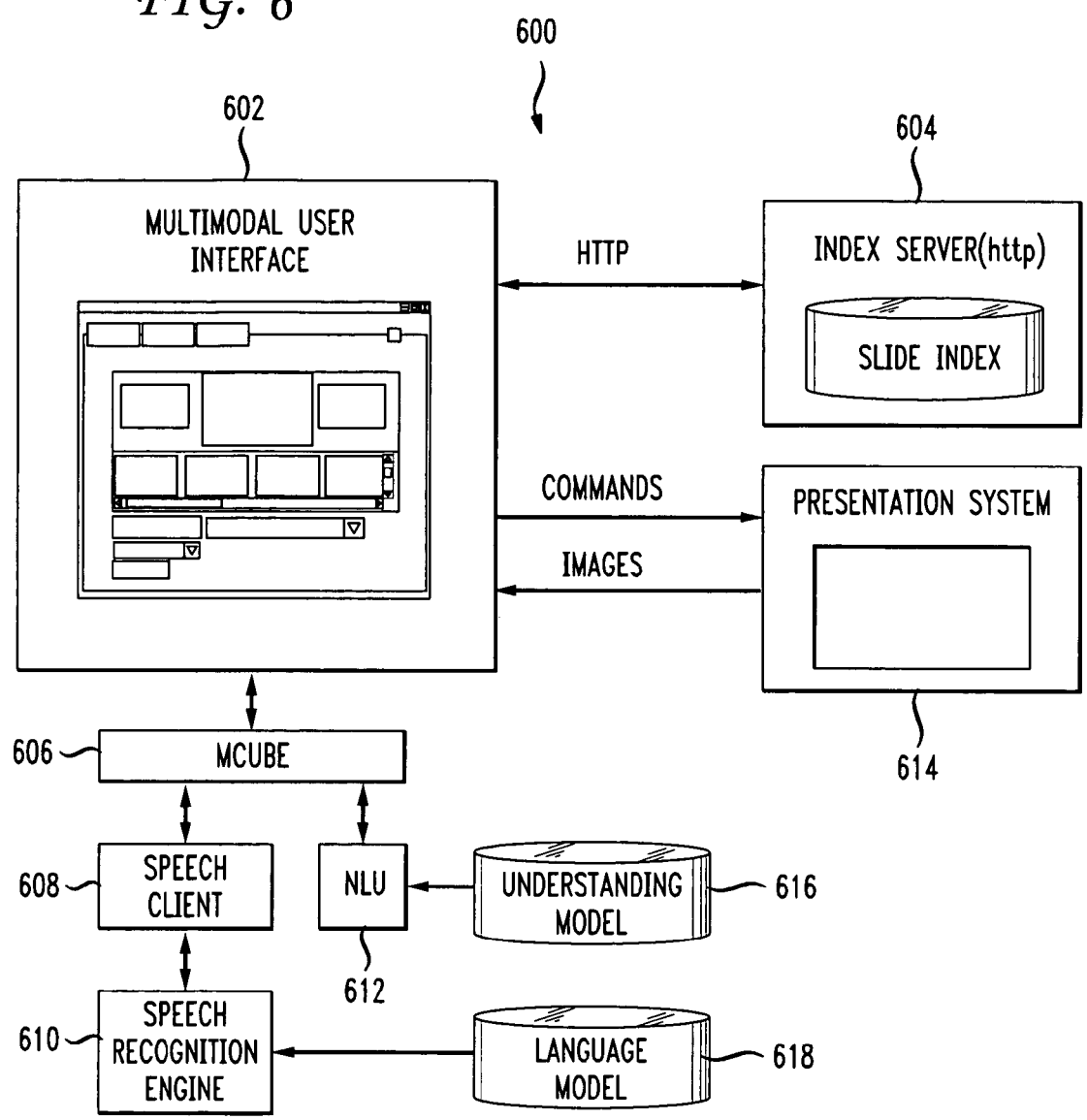

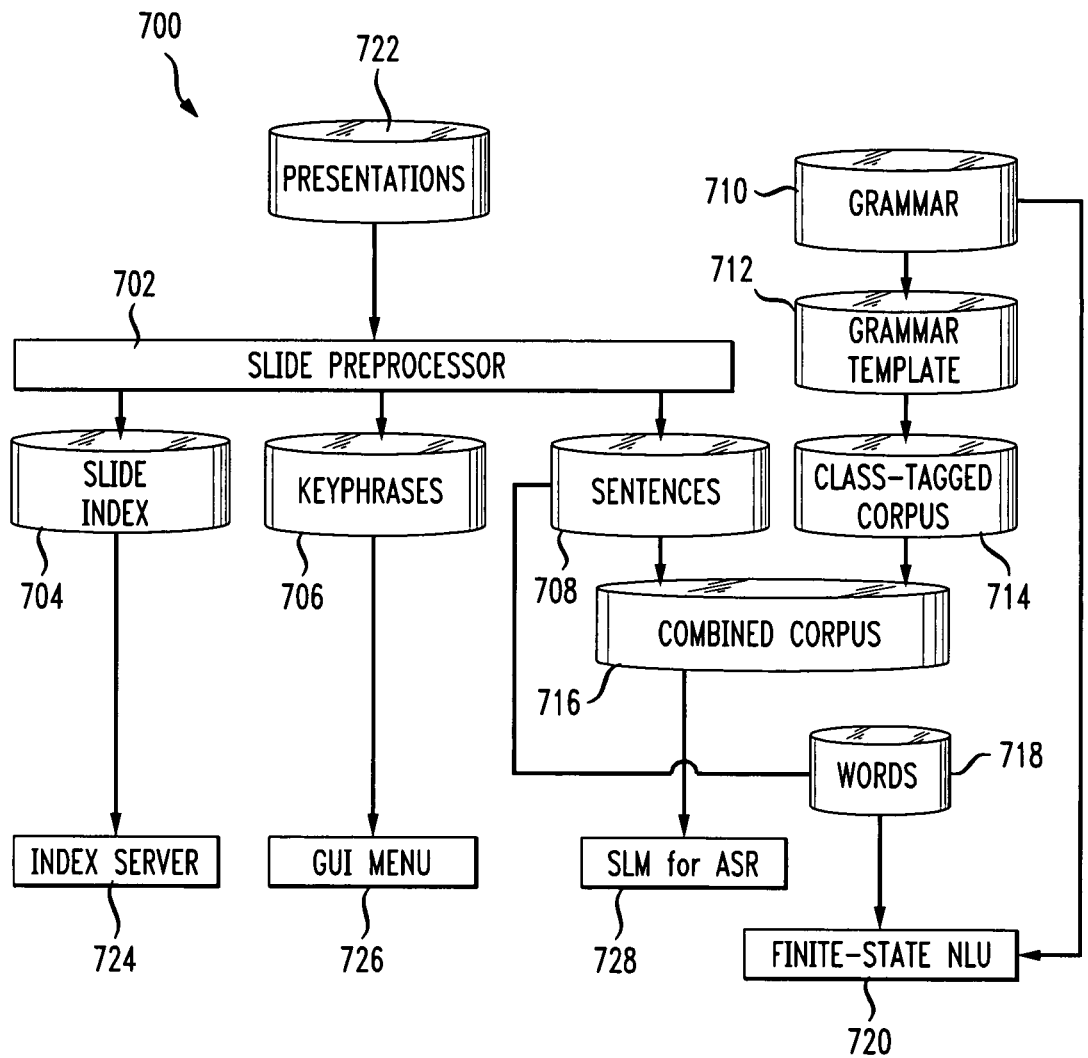

SYSTEM AND METHOD FOR CREATING A PRESENTATION USING NATURAL LANGUAGE

RELATED APPLICATION

The present application is related to Ser. No. 11/207,439 the contents of which are incorporated herein by reference.

BACKGROUND OF THE INVENTION

1. Field of the Invention

The present invention relates to media presentations and more specifically to a system and method of creating a presentation using natural language.

2. Introduction

In the workplace and classroom, a common task is the preparation of a sequence of media segments such as slides to an audience as part of a formal presentation. Microsoft's PowerPoint® software provides an example of an application that enables users to prepare a presentation of visual images stepping from one slide to another. Such applications provide users with an opportunity to teach, sell, give briefings and so forth with more substance and power than merely by speaking.

Use of such presentation software over time results in a collection of old presentations, each comprising a plurality of segments. While old presentations are not often used in their entirety in the future, individual segments pulled from old presentations are useful in composing new presentations. The problem with the current technology is that users have to sort through existing sources of content manually, often one-by-one, in order to find the slides or other segments they need.

Furthermore, in many cases where a user is working to create a presentation, various images, pictures, text, and other information needs to be researched in order to prepare the presentation. This can be a time-consuming process in that the specific information desired by the user may not be readily available.

What is needed in the art is an improved method and system for retrieving electronic presentation segments from existing sources to be used in composing a new presentation.

SUMMARY OF THE INVENTION

Additional features and advantages of the invention will be set forth in the description which follows, and in part will be obvious from description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art. The controls available in a typical presentation system do not allow the user to easily and rapidly find the content required to create a presentation without manually sorting through individual slides. The present invention enhances the control of a user over his or her presentation by introducing the capacity to find and incorporate material into a presentation on the basis of its content, above and beyond the original location of that material in the context of a particular presentation.

The invention provides for a system, method, and computer readable medium storing instructions related to creating an electronic slide presentation using a multimodal system. The method embodiment of the invention is a method for the retrieval of information on the basis of its content for incorporation into an electronic presentation. The method comprises receiving from a user a content-based request for at least one segment from a first plurality of segments within a media presentation preprocessed to enable natural language content searchability; in response to the request, presenting a subset of the first plurality of segments to the user; receiving a selection indication from the user associated with at least one segment of the subset of the first plurality of segments; and adding the selected at least one segment to a deck for use in a presentation.

BRIEF DESCRIPTION OF THE DRAWINGS

In order to describe the manner in which the above-recited and other advantages of and features of the invention can be obtained, a more particular description of the invention briefly described above will be rendered in reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a method embodiment of the invention;

FIG. 4C illustrates a selection panel in the GUI;

FIG. 5 illustrates the interactions of the human user and the system;

FIG. 6 illustrates the architecture of the underlying system; and

FIG. 7 illustrates the presentation processing architecture.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention enables a user to more efficiently prepare an electronic presentation, utilizing existing sources of content. The invention contemplates a multimodal interface where the user can interact with a computing device in multiple ways, such as a graphic touch sensitive display, a motion sensor interactive system, and a voice interaction and natural language dialog.

Figure 1:
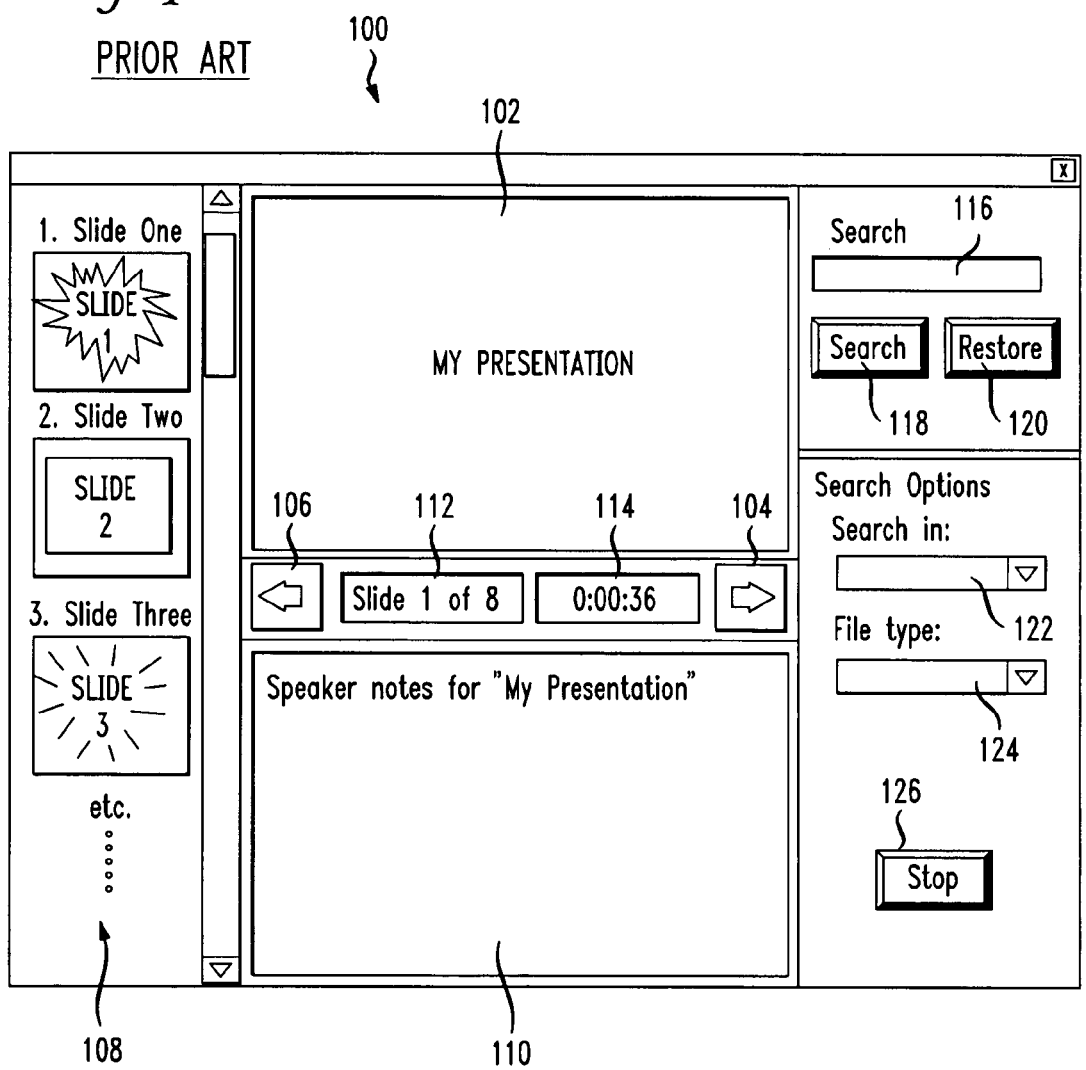
FIG. 1 illustrates a graphical user interface typical of a presentation system.

First, a known user system is discussed. FIG. 1 is an illustration of a presentation system used in preparing a sequence of prepared slides graphical user interface (GUI) 100. GUI 100 may include a current slide field 102, next slide button 104, previous slide button 106, scrolling slide tray 108, speaker notes area 110, slide counter bar 112, slideshow timer bar 114, search field 116, "SEARCH" button 118, "RESTORE" button 120, search in field 122, file type field 124, and "STOP" button. Clicking button 120 clears the contents of search field 116. The user may specify the location of the search using drop-down list 122, such as just on hard drive C, presentations folder. The user may specify the file types which the system should return in response to the search in field 124, such as Powerpoint and Microsoft Word. Clicking button 126 while a search is in progress stops the search. The search 116 option is shown by way of example as a feature in PowerPoint where a user inputs data in the field to search the computer for titles of files or previously created PowerPoint presentations. The user must select the option to search which presents the fields and options shown in FIG. 1. However, the search mechanism is cumbersome and time-consuming.

Current slide field 102 continuously displays to the slide which is selected at that time. Clicking on the next slide button 104 proceeds to the next slide in the deck. Clicking on the previous slide button 106 proceeds to the slide shown just prior to the current slide in the deck. The scrolling slide tray 108 displays thumbnail images of all of the slides in the deck in the order arranged by the user. Speaker notes area 110 may display text accompanying a given slide for use by the user in his or her spoken presentation, or to describe the contents of each slide. The function of slide counter bar 112 is simply to show the number of the slide currently on display out of the total number of slides in the deck. Slideshow timer bar 114 continuously displays the elapsed time from the beginning of the presentation and can be used by the user to specify the point in time in the slide show at which each slide should be presented.

A system such as that illustrated in FIG. 1 simply matches words specified by a user with words appearing in existing files. Slides located by a prior art system such as that illustrated in FIG. 1 require the user to open the source presentation of the desired slide and then manually copy and paste desired content to a new slide in a new slide presentation. By contrast, the invention described herein utilizes more highly developed methods for understanding user input. Furthermore, the invention streamlines the process of adding existing content to a new presentation.

Figure 2:
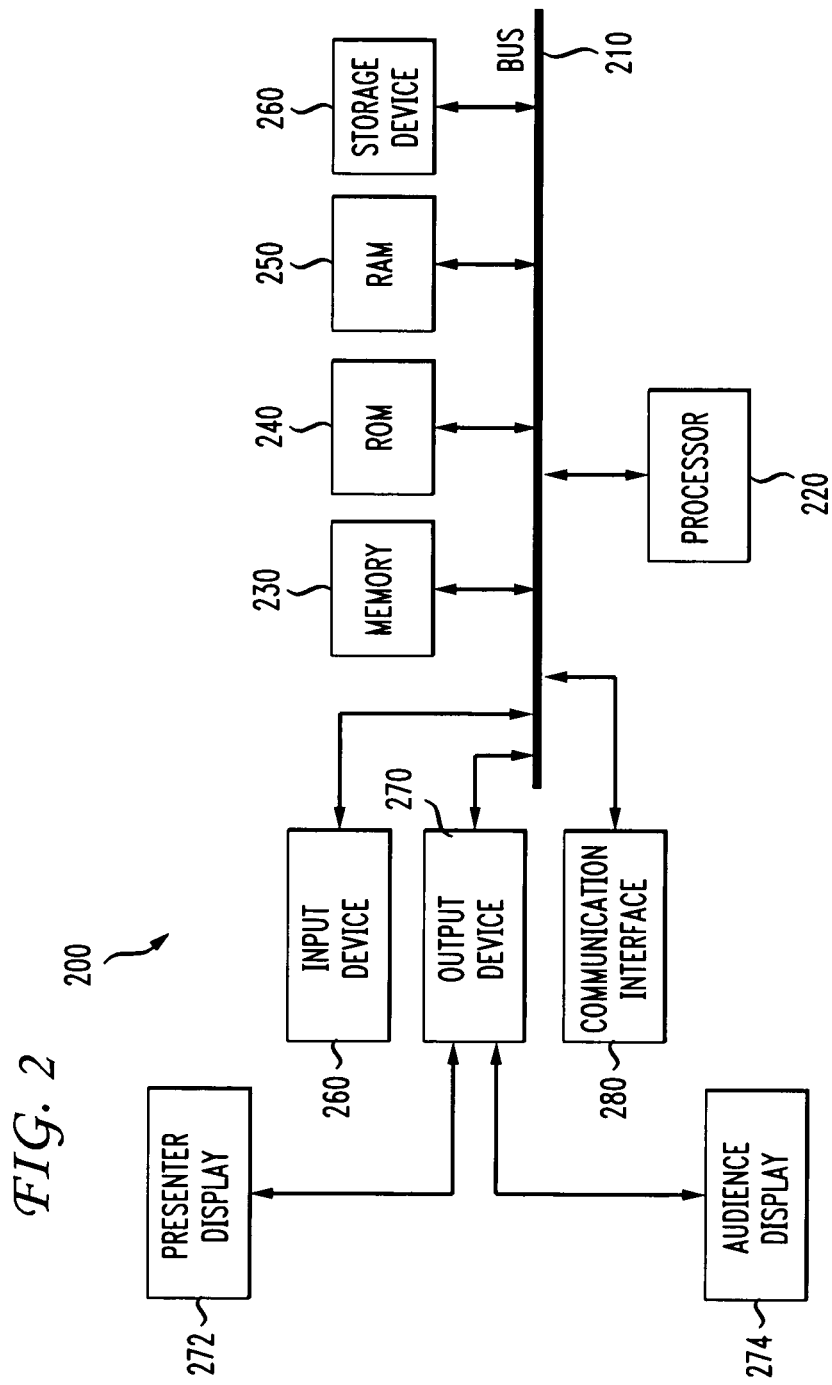
FIG. 2 illustrates a general computing device.

There is a need for the ability to navigate rapidly and easily to the content required to support a presentation without having to manually sort through and copy and paste content from its original source. A system and method is presented herein that comprises a multimodal graphical user interface capable of content-based information retrieval for the creation of new multimedia presentations. The present invention improves upon prior systems by enhancing the user display and enabling the user to use a multimodal search and retrieve mechanism to more efficiently access existing information while preparing a new slide/segment presentation. With reference to FIG. 2, an exemplary system for implementing the invention includes a general-purpose computing device 200, including a processing unit (CPU) 220, a system memory 230, and a system bus 210 that couples various system components including the system memory 230 to the processing unit 220. It can be appreciated that the invention may operate on a computing device with more than one CPU 220 or on a group or cluster of computing devices networked together to provide greater processing capability. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 200, an input device 260 represents any number of input mechanisms, such as a microphone for speech, a touch-sensitive screen for gesture or graphical input, keyboard, mouse, motion input, speech and so forth. The input may be used by the user to indicate the beginning of a speech search query. The device output 270 can also be one or more of a number of output means. Wherein a presenter display 272 and audience display 274 are convenient, they may be used. Further, other presenter displays may be utilized as well. For example, if the invention is used in a conference setting where multiple people may each need an individual presenter view. Multimodal systems such as the invention enable a user to provide multiple types of input to communicate with the computing device 200. The communications interface 280 generally governs and manages the user input and system output.

The illustration FIG. 3 shows the method embodiment of the invention that is practiced by an exemplary computing device. The method preferably is practiced in the context of a user preparing a presentation. The method begins with the exemplary computing device receiving from a user a content-based request. The request relates to a search for at least one segment from a first plurality of segments within a media presentation. The searchable data has been preprocessed to enable natural language content searchability (302). As an example, the user may be preparing a PowerPoint slide show about American history and desire to use a particular slide from an old presentation. The user can state "please find the slide about Lexington and Concord". The request may be based on the content of the particular slide the user desires to find. The computing device, in response to the request, presents a subset of the first plurality of segments to the user (304). There may be several slides having similar or related content, such as about Lexington and Concord. Given that the computing device shows a subset of the first plurality of segments in response to the inquiry, the user can easily narrow the selection from the second group of segments by another multimodal input such as touching the touch sensitive screen or by speaking and saying "slide number 2". Suppose three slides matched the inquiry and that in their original slide presentations, these slides were numbered 10, 12 and 25.

The second group of segments may be assigned new numbers such as slide number 1, 2, 3 etc. such that the user can easily indicate at least one segment of the subset of the first plurality of segments 306. For example, the user may say "slide three" instead of being required to say "slide twenty-five" to add that slide to his or her new presentation. Once the computing device receives the user selection, it adds the selected at least one segment to a presentation deck (308).

As can be appreciated, the present invention provides an improvement over a simple word search method which may or may not retrieve the desired segments for the user to build a new deck for a presentation. The present invention enables a natural language interface to searching preprocessed content to aid the user in generating a new presentation, such as a Powerpoint presentation.

The computing device operated by the user may have a communications connection that allows the user access to a variety of decks or segments. The computing device may communicate via a local network, secured network, wireless network such as a Bluetooth or any type of wireless protocol, or any other communication means to other data that may be preprocessed as a searchable deck. For example, if the user is a college professor and has on his or her office computer a slide presentation from a previous lecture that has information pertinent to a new presentation, and assuming that the office computer is networked to the computing device running the presentation, the user can say "please pull the slide regarding the battle of Bunker Hill from my office computer, September presentation". Other language of course may be used but the computing device can identify from this the computer to check, and which preprocessed presentation (the September one) to search for the appropriate slide. Similarly, the user may have a portable computing device having a preprocessed slide that the user was working on while traveling. The user could say "please present from my handheld computer the slide about the battle of Bunker Hill."

The above functionality is enabled by a connectivity and synchronization between the computing device on which the user is preparing his or her presentation and the other computing device that holds the updated document(s). The connectivity may be accomplished via a wired connection, a wireless connection such as Bluetooth, WiFi, a cradle connect, Ethernet, USB, serial port and so forth. The synchronization may involve automatically identifying updated content, and indexing the content to the server or presentation computing device such that the updated content is incorporated into the grammar and made searchable via the system.

The computing device storing the updated content may declare when it is connected to the computing device used by the user in preparing his or her presentation that it wants a deck to be made available for processing and indexing. The computing device may then transmit a copy of the relevant information such as the corpus and other information over the connection to the computing device on which the user is preparing his or her presentation.

Figure 4A:
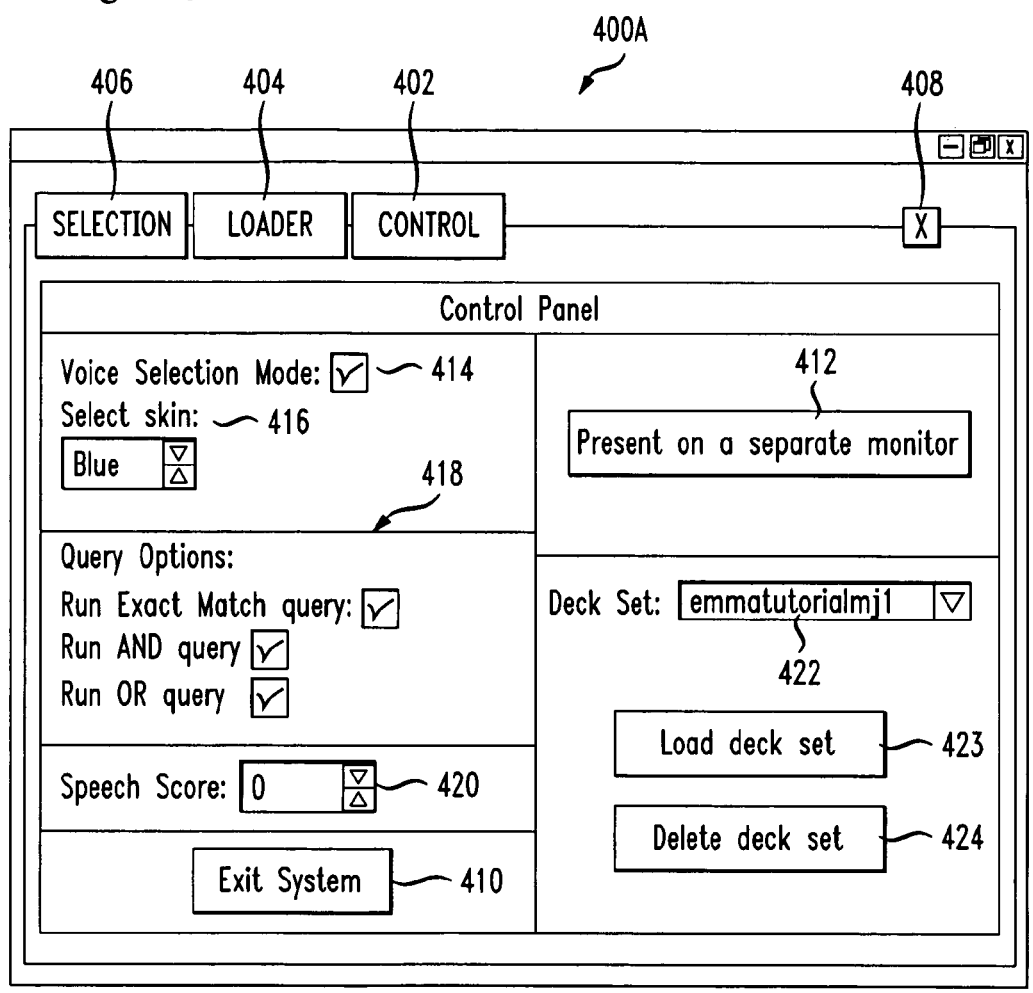
FIG. 4A illustrates a control panel in the Graphical User Interface.
Figure 4B:
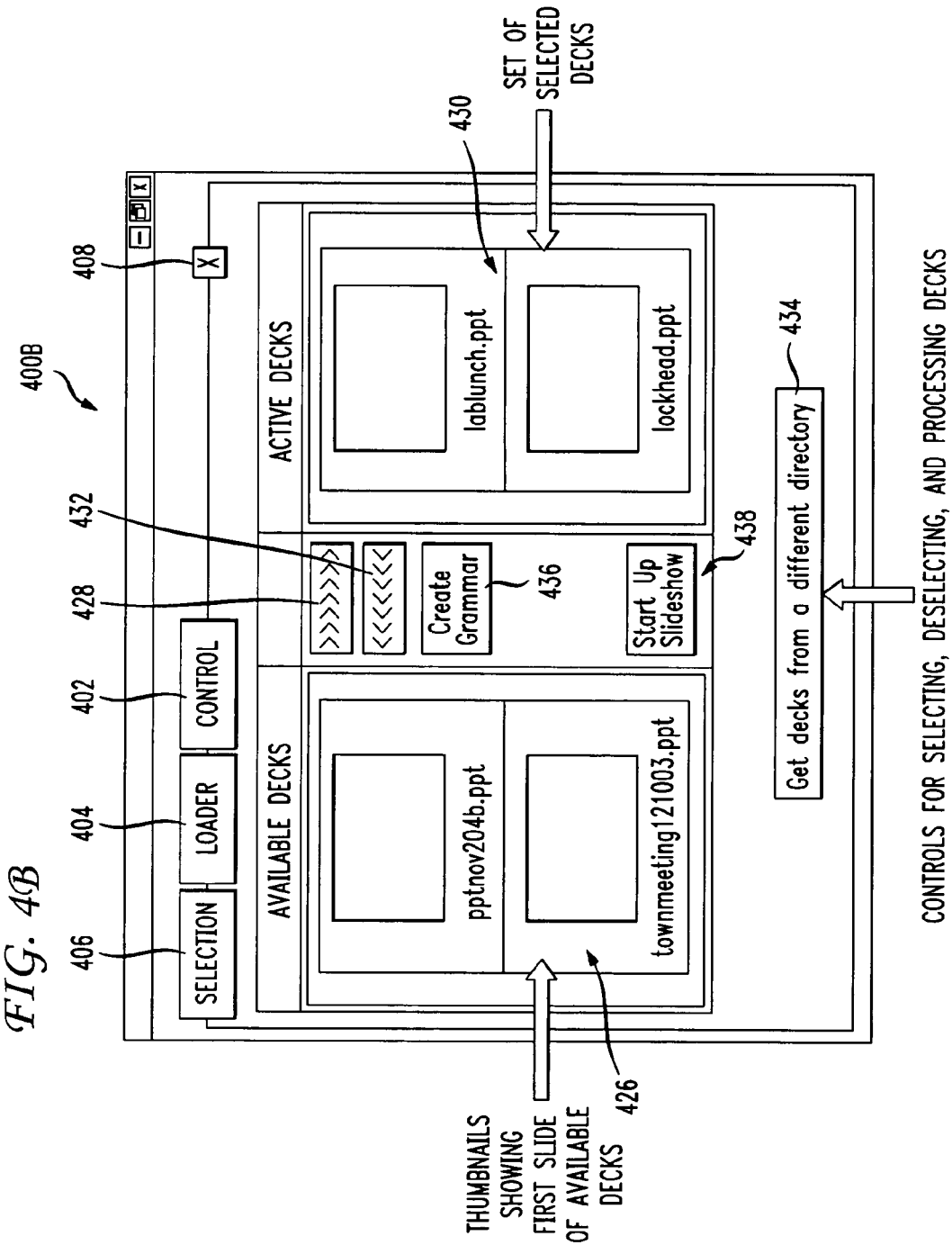
FIG. 4B illustrates a loader panel in the GUI.

The illustrations entitled FIG. 4A, FIG. 4B, and FIG. 4C represent several views of an exemplary graphical user interface (GUI). GUI module may include a control view 400A, loader view 400B, and selection view 400C. Features shared in the child views for which GUI is the parent view may include the control tab 402, loader tab 404, user tab 406, and exit tab 408.

Control tab 402 may be used to change views to control view 400A and to indicate when the present view is the control view. Loader tab 404 may be used to change views to loader view 400B and to indicate when the present view is loader view. User tab 406 may be used to change views to user view 400C and to indicate when the present view is selection view.

Upon initiating the module GUI 400, an exemplary first screen presented to the user is control view 400A as illustrated in FIG. 4A. This view may contain fundamental controls on which controls in the loader view 400B and user view 400C are based as well as additional controls. Controls in the control view 400A may include an "EXIT SYSTEM" button 410, "PRESENT ON A SEPARATE MONITOR" button 442, "VOICE SELECTION MODE" checkbox 414, "SELECT SKIN" drop-down list 416, "QUERY OPTIONS" checkbox field 418, "SPEECH SCORE" value field 420, "DECK SET" drop-down list 422, "LOAD DECK SET" button 423, and "DELETE DECK SET" button 424.

Button 410, when clicked, or otherwise initiated by an input, exits GUI 400. Button 412, when clicked, or otherwise initiated by an input, configures the presentation system to work in concert with a slide show system such as GUI 100 to produce an output signal on a separate display. Checkbox 414 functions as a logical switch within GUI to variously activate or deactivate the option through which a user's voice commands may be used to select the segment to be added to a presentation. Items on drop-down list 416 may be selected in order to customize the appearance of GUI 400 to the user. Checkbox 418 may be used to control how queries are evaluated against an index of the contents of the slides. Value field 420 may display speech score pertaining to voice recognition in the computing device. The user may specify the directory of a deck set using drop-down list 422. The directory of a deck set may be loaded for use within GUI 400 via button 423 or deleted from GUI 400 via button 424.

The term deck may have its standard meaning or may refer to a single media presentation such as a PowerPoint presentation or may refer to a group of presentations of one or more types. For example, a deck may be loaded of a group of PowerPoint presentations and a group of Microsoft Word documents and WordPerfect documents. In general, the deck is a group of searchable documents that are made available to the user during a presentation. A deck may be grouped onto one computing device or may be distributed among interconnected (wired or wireless) computing devices.

Thus, the modules of system 400A may be used to exit the GUI, configure a separate video monitor, set the voice selection mode, customize the appearance of the GUI to the user, control how queries from the user are evaluated against an index of the contents of slides, indicate the speech score, specify deck sets, and load or delete deck sets to be used within the computing device. In this manner, the user can control the behavior, appearance, and other variable settings of the GUI. Those of ordinary skill in the art will understand the programming languages and means for generating the buttons, check boxes, drop-down lists, and value fields which may be contained in control view 400A.

The second-level view within the GUI is the loader view 400B, illustrated in FIG. 4B. Important controls on the loader view 400B include an "AVAILABLE DECKS" pane 426, an "ACTIVE DECKS" pane 430, an "ACTIVATE DECK" button 428, as well as a "DEACTIVATE DECKS" button 432, "GET DECKS FROM A DIFFERENT DIRECTORY" button 434, a "CREATE GRAMMAR" button 436, and a "START UP SLIDESHOW" button 438.

Pane 426 contains thumbnails showing the first slide of each available deck. Pane 430 contains thumbnails showing the first slide of each active deck. Available decks may be transferred from pane 426 into pane 430 either by dragging and dropping (as in: by means of a mouse pointer), by voice command, or by use of button 428. Conversely, active decks may be deactivated by dragging and dropping, by voice command, or by means of button 432. Button 434 allows the user to specify material in directories other than that listed in pane 426. Button 436 initiates the process addressed by FIG. 7 whereby active decks are indexed sufficiently to enable content-based queries. When clicked, or otherwise initiated, button 438 starts up the slideshow as it will appear when displayed to an audience.

The available decks, when transmitted to the active deck group via button 436, causes the computing device to preprocess the available deck such that a grammar is created based on the content of the deck. Decks may be selected and preprocessed such that a database is created including a grammar that may be used as part of a spoken dialog interface to retrieve portions of each deck. In the example above, an available deck may include several slides that refer to the Battle of Lexington and Concord. The preprocessing of these decks processes the content, which may include metadata information or user notes information, such that an active deck can be searchable via a voice input. Words associated with segments that may be processed and thus searched may include words or text that describes non-text content. For instance, "image:dog" describes a picture within a slide. This type of data may be automatically or manually added as part of the preprocessing or may be part of the software used to create the deck or presentation. For example, in software such as PowerPoint, the user may be asked to provide keywords describing an image in a slide (See FIG. 1, field 110). The keywords are available to the preprocessor for future searching and retrieval by the user. The slide or segment may also include audio clips, video clips, or other features that may be searched or made searchable.

While the available decks 426 may be selected and placed in the available deck fields before preprocessing, an aspect of the invention discussed further below is a method and system for searching for decks, slides, or any document already preprocessed to make it searchable via the natural language interface disclosed herein. In this regard, there may be minimal or no further preprocessing of the selected deck via button 428 or 436 in that the selected decks have already been preprocessed.

Consider again the example above of the user making changes or generating an additional slide or slides while traveling, and then desiring to access the recently changed slides on a portable computing device. In that case, the portable device may have software capable of preprocessing the slide(s) such that they are available for searching, at which point the portable device and the computing device used to prepare the presentation may automatically communicate and "synchronize" such that the grammar on the user computing device is updated to include the changed slides to make those slides searchable. The slides may also be automatically transferred to the computing device or be accessible via a wired or wireless connection for searching.

Utilizing the controls available on view 400C, the user can specify which decks will be included in content-based queries which are executed during the course of a presentation, get decks from a different directory, create a grammar for use as an understanding model for the system, and start up the slide show. The loader view plays a significant role in defining the first plurality of segments discussed in system 300 step 302 (see FIG. 3). It is generally understood that the preprocessing of the available decks is performed in advance of a presentation. However, there may be instances where a user, dynamically while in a presentation, may select an available deck, process the deck, and make it available during the presentation. The architecture of the system supporting some of the functions available to the user via loader view 400C is further illustrated in FIG. 7.

An aspect of the present invention is demonstrated in the selection view 400C illustrated in FIG. 4C. Controls on the user view 400C may include a view of the "CURRENT SLIDE" 440, a preview of the "NEXT SLIDE" 442, a review of the "PREVIOUS SLIDE" 444, a "CLICK TO SPEAK" button 446, a "SPEECH FEEDBACK" window 448, a scrollable list of slides matching a query from the user 450, and a "GO BACK" button 452.

View 440 continuously displays the current slide. Whenever a new slide is added to the presentation, it appears in the current view and is inserted into the deck at the point between the previous slide and the next slide. If there is no previous slide, the current view is of the first in the deck. Likewise, if there is no next slide, the current view is of the last slide in the deck. Preview 442 is a thumbnail image of the slide immediately succeeding the current slide. Review 444 is a thumbnail image of the slide immediately preceding the current slide. Button 446, when clicked, or otherwise initiated, indicates to system 400 that the user's vocalizations should be interpreted as commands for use in controlling the system. Other speech initiation controls may exist as well, such as a particular trigger word such as "computer, search for". Window 448 displays to the user text generated by the computing device to show explicitly the manner in which the system has interpreted an input, preferably in the form of speech, from the user. List 450 displays thumbnail images of segments which the system most closely associates with the text it has received via an input from the user. In the event that the user desires to return to previous material, he or she can do so using button 452.

Thus, the user view 400C provides simple controls allowing the user to view the current slide being displayed, preview the next slide in a prepared sequence, review the previous slide in a prepared sequence, indicate to the system that his or her speech should be interpreted as commands for the multimodal presentation control system, verify the accuracy of the system's voice recognition module in the form of text, view a second group of media segments retrieved by the system in response to the user inquiry and go back to the previous system state as needed. The architecture of the system supporting the functions available to the user via selection view 400C is illustrated in FIG. 6.

Again, as an example, if the user clicks the "CLICK TO SPEAK" button 446 and says, "let's go find the slide about Lexington and Concord", the system will return and present the group of slides in response to the inquiry in field 450. They may be numbered or presented in some other fashion such that the user can easily narrow down which slide or slides to insert into the new presentation deck.

The main operation of the system that is relevant for this patent submission occurs in the user view 400C (see also FIG. 3). Once a user has selected presentations using the loader view 400B, he or she may switch to the user view 400C in order to access the contents of loaded decks. The system supports two kinds of commands: basic commands and content-based commands. Basic commands may be used for navigating among slides such advancing to the next slide, going back to the previous slide, jumping to the first or last slide, jumping to a slide by number, and going back. All of these basic commands can be given in speech. For example, "next slide please," "please show the previous slide," "please show slide five," "go back." All basic commands apply in like manner to any presentation, and without regard to the content of a presentation. Content-based commands in contrast, allow the user to navigate to slides based on alphanumeric text, words, themes and phrases that appear in the slides, metadata, user notes and so forth. The following are examples of content-based commands: "please show slides about internet security," "can you find me the slide on pension planning?" "do you have a slide about multimodal interfaces?" These content-based commands and the interface around them are the central part of the invention described herein.

Further, in user view in FIG. 4C, a pull-down menu 447 associated with a list of key phrases is included. This enables the user to easily access some basic or commonly used phrases within the content. This and other pull-down menus may be utilized to improve the speech recognition and to avoid manually sorting through content. For example, this pull-down menu 447 may be pre-populated with phrases that summarize the content of segments, such as "Lexington/Concord" and "Bunker Hill". The user may then be able to navigate to specific content using this pull down menu instead of the speech interface. The source for the data for the pull-down menu 447 is the preprocessed decks and the content analysis performed.

The diagram in FIG. 5 shows the interaction flow method 500 when a user gives a content-based request during a presentation. The first row of steps illustrate various input means to the system. In step 502, the user says what he or she wants, such as "give me slides about Service over IP". In step 504, the user types what he or she wants. In step 506, the user uses graffiti to write what he or she wants. Graffiti may include handwritten input. Other means of input may also be used such as motion input or a combination of inputs modalities. In step 508, the system receives the request, performs an intelligent search of available data, and presents options to the user, which may be accomplished graphically. In step 510, the user selects among the options presented in step 508. Finally, in step 512, the system adds the selected slide or segment to the deck being created.

In the first step the user can issue the content-based query, either by speech 502, typing 504, or writing relevant words using a pen 506. The inclusion of these three specific means of input is not intended to preclude the use of other means of input capable of conveying meaningful content to the system. In the second step 508, the system makes use of the graphical display (section 450 of the user view 400c illustrated in FIG. 4C) to present options to the user from which to make a selection. The advantage of this for the user is that he or she can view the possibilities during a presentation without necessarily opening each of the existing presentations in which the various segments were originally used. The next step 510 is for the user using voice, gesture, pen, via touch-screen, or by other means to select the desired slide from the group of slides presented in step 508. In the final step 512 of method 500, the selected slide is then added to the deck being created.

The system illustrated in FIG. 6 is the underlying architecture of the multimodal system for content-based control 600. FIG. 6 shows the components of the system. The user interacts with a multimodal GUI 602. Variations on this GUI are illustrated in FIGS. 4A, 4B, and 4C. Interface 602 communicates using HTTP or some other protocol with an index server 604 which in response to a content-based command returns a list of the slides or segments which are relevant to the query. This step can also be achieved using Xpath queries over an XML version of the slide presentation, without an HI IP connection or index server. The interface 602 is connected over TCP/IP sockets to a facilitator agent MCUBE 606 which enables system components to communicate with each other. Also connected to MCUBE 606 is a speech client 608 which collects speech from the user when indicated by the user (please see FIG. 4C, button 446) and communicates with the speech recognition engine 610 (such as AT&T's Watson™ speech recognizer) which draws upon a language model 618 as is known in the art in order to provide a transcription of the command given by the user. The Natural Language Understanding component (NLU) 612 converts the recognized speech into a semantic representation in XML using a language understanding model 616, which the multimodal UI 602 can execute. The NLU is currently achieved using a finite-state transducer such as are known to those of skill in the art. Application Ser. No. 09/904,253, filed Jul. 12, 2001 and Ser. No. 10/278,921 filed Oct. 24, 2002 and U.S. Pat. No. 6,868,383 represent information related to this technology that is incorporated herein by reference. This step could also be achieved with other kinds of grammar-based or trained understanding systems. The multimodal user interface 602 also communicates with the presentation software (see FIG. 1). This is used in order to access content on the slides, get graphical thumbnails of slides, and change what is shown to the audience. Presentation system 614 represents the control of the presenter view and the audience view of the presentation. It is understood that any type of spoken dialog modules for speech recognition, language understanding, and so forth may be utilized. There is no specific speech technology that is essential to the practice of the invention.

FIG. 7 provides an illustration of system 700 that outlines the processing that takes place in order to build a language model, understanding model, and index for a selected set of presentations. This processing takes place when indicated by the user (see FIG. 4B, button 436) or may be automated to process decks to make them available controlling. The set of presentations 722 are processed by a slide preprocessor 702 which extracts the content from the slides and generates three outputs. The first of these is an XML or web form of the set of slides 704 which is indexed by the index server 724 and used for information retrieval. The second is a list of key phrases 706 that are used to populate a GUI menu 726 in the user view, which allows quick input of queries by selection from a pop-up menu. The third is a corpus of all the sentences that appear on all of the slides 708. A finite-state grammar 710 describes how to assign XML semantic representation to sentences spoken by the user. A grammar template 712 is built from finite-state grammar 710 and used to create a class-tagged corpus of sentences 714. The class tag in this corpus is used to abstract over specific content in content-based queries. The set of sentences extracted from the slides 708 is substituted into place of the content class tag in 714. The resulting corpus 716 is used to build a stochastic language model for use in speech recognition. The words contained in the list of sentences 718 are extracted and used to extend the grammar so that it can be used as an understanding model for the system (NLU) 720. The stochastic language model (SLM) for automatic speech recognition 728 is generated from the combined corpus 716 using the sentences 708 and class-tagged corpus 714 from the grammar 710.

The content of slides within a presentation or presentations is used to create an index, a list of key phrases, and a grammar. These elements, when used in combination, allow the slides in presentation to be searched and retrieved on the basis of their contents. As discussed above, this process in one aspect of the invention is performed for presentations, documents, slides, segments or other data in advance of the user beginning to generate a new presentation. The preprocessing can be done for this group of data that can then be searched and selected by the user for inclusion in a new presentation.

Embodiments within the scope of the present invention may include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practices in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, while Microsoft's PowerPoint application has been mentioned, the invention is not limited to "slideshows" but is applicable to any presentation where content needs to be accessible and searchable. For example, movies may be preprocessed in this way where the subtitle information is processed and a grammar created that associates the content or portion of the text with a scene such that the user can say "please take me to the scene where Darth Vader says 'I am your father'". In this regard, Ser. No. 11/213,457 is incorporated herein by reference. Applying the video context to the present invention, assume a "deck" comprises both a PowerPoint presentation and a preprocessed movie such as Star Wars episode V. The user could be in the middle of the slideshow and access segments from the movie by saying "present the scene where Darth Vader says 'I am your father'". One or more indexed segments of the video presentation may be shown on the user display for selection and presentation to the audience. Similarly, such video segments may be available for insertion as video clips into a multimedia presentation that a user is preparing. In this manner, it can be seen that any type of segmented multimedia presentation may be preprocessed and included or accessible as a deck. Different types of presentations may also be accessible to enhance the power of the user's presentation. Accordingly, the appended claims and their legal equivalents should only define the invention, rather than any specific examples given.

We claim:

1. A method comprising:
   at a first time, prior to a presentation on a presentation device:
   receiving, on the presentation device, a grammar which assigns semantic representations to natural language input; and
   updating the grammar based on a searchable plurality of presentation source files stored on a storage device connected to the presentation device via a network, to yield an updated grammar, wherein the searchable plurality of presentation source files comprise one of audio clips and video clips, wherein the searchable plurality of presentation source files is processed by extracting content from each searchable presentation source file to generate
   (1) a web-based form of each searchable presentation source file;
   (2) a listing of key phrases; and
   (3) a corpus of all sentences that appear in all the searchable presentation source files; and
   at a second time after the first time, during the presentation, and on the presentation device:
   receiving, from a user, a spoken natural language content request for a presentation source file from the searchable plurality of presentation source files;
   identifying possible presentation source files in the searchable plurality of presentation source files, wherein the possible presentation source files are identified by using the updated grammar to process the spoken natural language content request;
   receiving, from the user, input identifying the presentation source file from the possible presentation source files, wherein the input is in a modality distinct from speech; and
   adding the presentation source file to a deck for use in the presentation.

2. The method of claim 1, wherein the presentation source file is confirmed by the user via one of graffiti, handwritten, typed, motion, and button click input.

3. The method of claim 1, wherein the presentation source files are viewgraphs.

4. The method of claim 1, wherein the list of keyphrases is used to populate a menu available to the user.

5. The method of claim 4, wherein the user can use the menu of key phrases to select searchable presentation source files.

6. A system comprising:
   a processor; and
   a computer-readable storage medium having instructions stored which, when executed by the processor, cause the processor to perform operations comprising:
   at a first time, prior to a presentation on a presentation device:
   receiving, on the presentation device, a grammar which assigns semantic representations to natural language input; and
   updating the grammar based on searchable plurality of presentation source files stored on a storage device connected to the presentation device via a network, to yield an updated grammar, wherein the searchable plurality of presentation source files comprise one of audio clips and video clips, wherein the searchable plurality of presentation source files is processed by extracting content from each searchable presentation source file to generate
(1) a web-based form of each searchable presentation source file;
(2) a listing of key phrases; and
(3) a corpus of all sentences that appear in all the searchable presentation source files; and at a second time after the first time, during the presentation, and on the presentation device:
receiving, from a user, a spoken natural language content request for a presentation source file from the searchable plurality of presentation source files;
identifying possible presentation source files in the searchable plurality of presentation source files, wherein the possible presentation source files are identified by using the updated grammar to process the spoken natural language content request;
receiving, from the user, input identifying the presentation source file from the possible presentation source files, wherein the input is in a modality distinct from speech; and
adding the presentation source file to a deck for use in the presentation.

7. The system of claim 6, wherein presentation source file is confirmed by the user via one of graffiti, typed, motion, and button click input.

8. The system of claim 6, wherein the presentation source files are viewgraphs.

9. The system of claim 6, wherein the list of keyphrases is used to populate a menu available to the user.

10. The system of claim 9, wherein the user can use the menu of key phrases to select searchable presentation source files.

11. A computer-readable storage medium having instructions stored which, when executed by a computing device, cause the computing device to perform operations comprising:

at a first time, prior to a presentation on a presentation device:
receiving, on the presentation device, a grammar which assigns semantic representations to natural language input; and
updating the grammar based on searchable plurality of presentation source files stored on a storage device connected to the presentation device via a network, to yield an updated grammar, wherein the searchable plurality of presentation source files comprise one of audio clips and video clips, wherein the searchable plurality of presentation source files is processed by extracting content from each searchable presentation source file to generate
(1) a web-based form of each searchable presentation source file;
(2) a listing of key phrases; and
(3) a corpus of all sentences that appear in all the searchable presentation source files; and at a second time after the first time, during the presentation, and on the presentation device:
receiving, from a user, a spoken natural language content request for a presentation source file from the searchable plurality of presentation source files;
identifying possible presentation source files in the searchable plurality of presentation source files, wherein the possible presentation source files are identified by using the updated grammar to process the spoken natural language content request;
receiving, from the user, input identifying the presentation source file from the possible presentation source files, wherein the input is in a modality distinct from speech; and
adding the presentation source file to a deck for use in the presentation.

* * * * *